United States Patent
Tanida et al.

(10) Patent No.: US 7,749,929 B2
(45) Date of Patent: Jul. 6, 2010

(54) GLASS FOR COVERING ELECTRODES AND PLASMA DISPLAY PANEL

(75) Inventors: Masamichi Tanida, Fukushima (JP); Tomoyuki Fukahori, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 771 days.

(21) Appl. No.: 11/529,302

(22) Filed: Sep. 29, 2006

(65) Prior Publication Data

US 2007/0078047 A1    Apr. 5, 2007

(30) Foreign Application Priority Data

Oct. 5, 2005   (JP) ............... 2005-292458
Oct. 24, 2005  (JP) ............... 2005-308300

(51) Int. Cl.
  *C03C 3/14*   (2006.01)
  *C03C 3/15*   (2006.01)
  *C03C 3/064*  (2006.01)
  *C03C 3/066*  (2006.01)
  *C03C 3/068*  (2006.01)

(52) U.S. Cl. .................. 501/49; 501/50; 501/77; 501/78; 501/79

(58) Field of Classification Search .......... 501/49, 501/52, 77, 79; 313/485
See application file for complete search history.

(56) References Cited

U.S. PATENT DOCUMENTS

| | | | |
|---|---|---|---|
| 6,010,973 A | 1/2000 | Watanabe et al. | |
| 6,255,239 B1 | 7/2001 | Sakoske | |
| 6,777,872 B2 | 8/2004 | Aoki et al. | |
| 6,784,130 B2 | 8/2004 | Morita et al. | |
| 6,787,239 B2 | 9/2004 | Fujii et al. | |
| 7,057,342 B2 | 6/2006 | Aoki et al. | |
| 7,208,430 B2 * | 4/2007 | Hasegawa et al. | 501/15 |
| 2003/0228471 A1 | 12/2003 | Hayakawa et al. | |
| 2004/0018931 A1 | 1/2004 | Sridharan et al. | |
| 2005/0231118 A1 | 10/2005 | Fujimine et al. | |
| 2006/0276322 A1 * | 12/2006 | Hasegawa et al. | 501/49 |

FOREIGN PATENT DOCUMENTS

| | | |
|---|---|---|
| JP | 9-268026 | 10/1997 |
| JP | 2001139345 A * | 5/2001 |
| JP | 2003-217442 | 7/2003 |
| JP | 2003-226549 | 8/2003 |
| JP | 2003-327448 | 11/2003 |
| JP | 2006298733 A * | 11/2006 |
| WO | WO 2004023511 A1 * | 3/2004 |
| WO | WO 2005007591 A1 * | 1/2005 |

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, L.L.P.

(57) ABSTRACT

Glass for covering electrodes, which consists essentially of, as represented by mol % based on the following oxides, from 25 to 60% of $B_2O_3$, from 0 to 18% of $SiO_2$, from 0 to 60% of ZnO, from 0 to 18% of BaO, from 3 to 15% of $Bi_2O_3$ and from 0 to 10% of $Al_2O_3$, and contains no PbO.

12 Claims, No Drawings

GLASS FOR COVERING ELECTRODES AND PLASMA DISPLAY PANEL

BACKGROUND OF THE INVENTION

Field of the Invention

The present invention relates to a plasma display panel (PDP) and glass for covering electrodes suitable for covering e.g. transparent electrodes formed on a glass substrate for PDP.

DISCUSSION OF BACKGROUND

In recent years, a thin flat plate type color display device has attracted an attention. In such a display device, an electrode is formed for each pixel in order to control the display state in the pixel for forming an image. As such electrodes, transparent electrodes, such as thin films of ITO or tin oxide, or thick film type Ag electrodes or thin film type Cr—Cu—Cr electrodes, formed on a glass substrate, are used in order to prevent deterioration of the image quality.

Transparent electrodes which are formed on the surface of a glass substrate to be used as a display panel of the above display device, are formed into fine lines to realize fine images. In order to control the respective pixels independently, it is necessary to secure insulation among such finely formed transparent electrodes. However, if moisture is present on the surface of the glass substrate, or if an alkali component is present in the glass substrate, it may happen that an electrical current flows to some extent via the surface of this glass substrate. To prevent such a current, it is effective to form an insulating layer between the transparent electrodes. Further, to prevent deterioration of the image quality by the insulating layer formed between the transparent electrodes, such an insulating layer is preferably transparent.

Various materials are known as an insulating material for forming such an insulating layer. Among them, a glass material is widely employed which is a transparent and highly reliable insulating material.

In PDP which is recently expected as a large size flat color display device, cells are defined and formed by a front substrate used as a display surface, a rear substrate and barrier ribs, and an image will be formed by generating plasma discharge in the cells. Transparent electrodes are formed on the surface of the front substrate, and electrodes called bus electrodes are formed to supplement electrical conductivity of the transparent electrodes. As the bus electrodes, the above-described Ag electrodes, Cr—Cu—Cr electrodes or the like may be used. To protect the transparent electrodes and the bus electrodes from plasma discharge, it is essential to cover these electrodes with glass excellent in plasma resistance.

Such glass to be used for covering electrodes, is employed usually in the form of a glass powder. For example, e.g. the transparent electrodes will be covered by e.g. a method wherein to such a glass powder, a filler, etc. may be added as the case requires, followed by mixing with a resin, a solvent, etc. to form a glass paste, which is then applied to a glass substrate having e.g. transparent electrodes preliminarily formed, followed by firing, or a method wherein to the above glass powder, a resin and, as the case requires, a filler, etc. are mixed to obtain a slurry which is then formed into a green sheet which is then laminated on a glass substrate having e.g. transparent electrodes preliminarily formed, followed by firing.

As the glass for covering electrodes of PDP, PbO-containing glass is used at present, and development is in progress to replace it with glass containing no PbO (non-lead glass) (for example, JP-A-2003-226549).

The above publication discloses a dielectric material for PDP containing a glass powder having a composition comprising, as represented by mass percentage, from 25 to 50% of $Bi_2O_3$, from 10 to 20% of ZnO, from 5 to 20% of BaO, from 5 to 35% of $B_2O_3$, from 0 to 15% of $SiO_2$ and from 0 to 10% of $Al_2O_3$, which may reduce yellowing resulting from bus electrodes (hereinafter referred to as yellow color by colloidal silver, etc.) on a dielectric layer (corresponding to the above insulating layer) of PDP.

A glass layer covering electrodes on the PDP front substrate is required to have a higher light transmittance so as to improve the image quality of PDP.

In the above publication, the light transmittance is evaluated employing the total light transmittance (wavelength: 550 nm) with respect to e.g. the glass layer obtained by firing a glass powder at 580° C. for 10 minutes. However, the total light transmittance is obtained by measurement with respect to the transmitted light including scattered light, and is not necessarily appropriate as the light transmittance.

It is appropriate to employ a linear light transmittance (T) as described hereinafter as the light transmittance, and in recent years, the glass layer is required to have T of at least 70%.

However, two glass substrates coated with a glass paste containing a powder of glass in Example 21 as described hereinafter (comprising, as represented by mass percentage, 18.9% of $B_2O_3$, 9.2% of $SiO_2$, 18.2% of ZnO, 13.8% of BaO and 39.9% of $Bi_2O_3$) within the composition range disclosed in the above publication were prepared and held at 570° C. and 590° C., respectively, for 30 minutes, and T was measured with respect to the obtained substrates provided with a glass layer, whereupon they were 63% and 61%, respectively. Namely, the glass having a composition within a range as disclosed in the above publication can not necessarily meet the requirement of T being at least 70%.

SUMMARY OF THE INVENTION

Under these circumstances, it is an object of the present invention to provide glass for covering electrodes which is $B_2O_3$—$Bi_2O_3$ glass (typically $B_2O_3$—$SiO_2$—ZnO—BaO—$Bi_2O_3$ glass) containing no PbO and which can make the above T high.

The present invention provides glass for covering electrodes (hereinafter sometimes referred to as the present glass), which consists essentially of, as represented by mol % based on the following oxides, from 25 to 60% of $B_2O_3$, from 0 to 18% of $SiO_2$, from 0 to 60% of ZnO, from 0 to 18% of BaO, from 3 to 15% of $Bi_2O_3$ and from 0 to 10% of $Al_2O_3$, and contains no PbO.

Further, the present invention provides the above glass for covering electrodes, wherein, as represented by mol %, $B_2O_3$ is from 28 to 32%, $SiO_2$ is from 11 to 17%, ZnO is from 29 to 35%, BaO is from 10 to 14%, $Bi_2O_3$ is from 7 to 10%, and $Al_2O_3$ is from 0 to 5%, i.e. glass for covering electrodes (hereinafter sometimes referred to as a first glass), which consists essentially of, as represented by mol % based on the following oxides, from 28 to 32% of $B_2O_3$, from 11 to 17% of $SiO_2$, from 29 to 35% of ZnO, from 10 to 14% of BaO, from 7 to 10% of $Bi_2O_3$ and from 0 to 5% of $Al_2O_3$, and contains no PbO.

Further, the present invention provides glass for covering electrodes (hereinafter sometimes referred to as a second glass), which consists essentially of, as represented by mass percentage based on the following oxides, from 14 to 20% of $B_2O_3$, from 6 to 9% of $SiO_2$, from 20 to 25% of ZnO, from 10 to 19% of BaO, from 30 to 38% of $Bi_2O_3$ and from 0 to 5% of $Al_2O_3$, provided that ZnO—($SiO_2+Al_2O_3$) is at least 9.5%, and contains no PbO.

Further, the present invention provides the present glass for covering electrodes, which contains at least one alkaline earth metal oxide selected from the group consisting of MgO, CaG, SrO and BaO, and $CeO_2$ and $MnO_2$, wherein, as represented by mol % based on the following oxides, MgO+CaO+SrO+BaO is from 7 to 18%, $CeO_2$ is from 0.05 to 0.2%, and $MnO_2$ is from 0.05 to 0.2%, i.e. glass for covering electrodes (hereinafter sometimes referred to as a third glass), which consists essentially of, as represented by mol % based on the following oxides, from 25 to 60% of $B_2O_3$, from 0 to 18% of $SiO_2$, from 0 to 60% of ZnO, from 7 to 18% of MgO+CaO+SrO+BaO, from 3 to 15% of $Bi_2O_3$, from 0 to 10% of $Al_2O_3$, from 0.05 to 0.2% of $CeO_2$ and from 0.05 to 0.2% of $MnO_2$, and contains no PbO.

Still further, the present invention provides a PDP comprising a front substrate to be used as a display surface, a rear substrate and barrier ribs to define cells, wherein electrodes formed on a glass substrate constituting the front substrate or electrodes formed on a glass substrate constituting the rear substrate are covered by any one of the above glasses for covering electrodes.

As described above, the object of the invention disclosed in the above publication is to reduce yellow color by colloidal silver, etc. on the dielectric layer of PDP, and the invention is to provide a non-lead $B_2O_3$—$SiO_2$—ZnO—BaO—$Bi_2O_3$ glass which can accomplish such an object. However, such a glass does not necessarily have the above T being at least 70%.

The present inventors have considered the representation of a glass containing an oxide of a heavy element such as $Bi_2O_3$ by the mass percentage to be problematic, and have invented the present glass, the first glass and the like employing representation by mol %.

Further, the second glass is represented by mass percentage, which was invented based on the finding that ZnO—($SiO_2+Al_2O_3$) being at least 9.5% is important to increase the above T.

Further, the present inventors have found that in a case where silver electrodes are covered by glass for covering electrodes containing $Bi_2O_3$ and containing no PbO, by incorporating both $CeO_2$ and $MnO_2$ into the glass, not only yellow color by colloidal silver, etc. but also coloring on the glass layer covering the silver electrodes, can be reduced, and invented the third glass.

According to the present invention, it is possible to increase the brightness of PDP which employs glass for covering electrodes containing no PbO.

Since the glass contains $Bi_2O_3$, it is relatively easy to adjust the dielectric constant of the non-lead glass to the dielectric constant of the PbO-containing glass used as a glass for covering PDP electrodes at present, and such an effect can be obtained that a conventional drive circuit can be used since the capacitance of the PDP cell will not change in such a case.

With the third glass, etc., yellow color by colloidal silver, etc. of PDP can be reduced, and further, coloring of a dielectric layer can be reduced, whereby it is possible to display an image with high color purity.

DETAILED DESCRIPTION OF THE PREFERRED EMBODIMENTS

The glass for covering electrodes of the present invention (hereinafter referred to as the glass of the present invention) is used usually in a powdery form. For example, the powder of the glass of the present invention will be formed into a glass paste by means of an organic vehicle, etc. to impart printability, and such a glass paste is applied on electrodes formed on a glass substrate, followed by firing to cover the electrodes. Here, the organic vehicle is one having a binder such as ethylcellulose dissolved in an organic solvent such as α-terpineol. Otherwise, the electrodes may be covered by means of the green sheet method as mentioned above.

In PDP, transparent electrodes are formed on the glass substrate constituting the front substrate, and the glass of the present invention is suitably used to cover the transparent electrodes. PDP in such a case is PDP of the present invention. Further, the glass of the present invention is useful for covering address electrodes formed on the rear substrate of PDP, and PDP in such a case is also PDP of the present invention.

The thickness of the glass substrate to be used for the front substrate is usually 2.8 mm. The transmittance (linear light transmittance) of this glass substrate itself to light having a wavelength of 550 nm is typically 90%.

The above transparent electrodes are, for example, in the form of strips having a width of 0.5 mm, and the respective strip electrodes are formed to be parallel with one another. The distance between the centerlines of the respective strip electrodes is, for example, from 0.83 to 1.0 mm, and in such a case, the proportion of the transparent electrodes occupying the surface of the glass substrate is from 50 to 60%.

With respect to the front substrate of PDP of which the transparent electrodes are covered by the glass of the present invention, the linear light transmittance ($T_{550}$) to light having a wavelength of 550 nm is preferably at least 70%. If it is less than 70%, the image quality of PDP may be insufficient.

The PDP of the present invention in which the glass of the present invention is used to cover electrodes of the front substrate, can be produced, for example, as follows, when it is of an alternating current system.

Namely, patterned transparent electrodes and bus electrodes (typically Ag lines) are formed on the surface of a glass substrate. Then, a powder of the glass of the present invention is applied and fired thereon to form a glass layer. Finally, a magnesium oxide layer is formed as a protecting layer, to obtain a front substrate. On the other hand, on another glass substrate, patterned electrodes for address are formed. Then, a powder of the glass of the present invention, a powder of a glass having Ts (softening point) at the same level as the glass of the present invention, or a mixture of such a powder of glass with a powder of a metal oxide such as alumina or an inorganic pigment such as titania, is applied and fired thereon to form a glass layer. Then, barrier ribs are formed thereon in a stripe fashion, in a lattice fashion or the like, and phosphor layers are further printed and fired, to obtain a rear substrate. Here, instead of using the glass paste to form the glass layer, a green sheet method or the like may be employed.

Then, along the periphery of the front substrate and the rear substrate, a sealing material is applied by a dispenser, and the front and rear substrates are assembled so that the transparent electrodes face the electrodes for address, followed by firing to obtain PDP. Then, the interior of PDP is evacuated, and a discharge gas such as Ne or He—Xe is introduced into a discharge space (cell).

The above example is of an alternating current system. However, the present invention is applicable also to PDP of a direct current system.

Ts of the glass of the present invention is preferably at most 605° C. If it exceeds 605° C., the firing temperature tends to be high, whereby the glass substrate may be deformed. It is typically from 580 to 600° C.

The glass transition point (Tg) of the glass of the present invention is preferably from 480 to 500° C.

The average linear expansion coefficient (α) from 50 to 350° C. of the glass of the present invention is preferably from $70 \times 10^{-7}$ to $80 \times 10^{-7}$/° C.

The relative dielectric constant ($\in$) at 20° C. at 1 kHz of the glass of the present invention is preferably from 11.0 to 12.5. If $\in$ is out of this range, the difference in $\in$ with the conventional glass for covering electrodes containing PbO tends to be significant, whereby the capacitance of the cell will greatly change, and the conventional drive circuit may not be used.

The glass of the present invention preferably contains none of $Li_2O$, $Na_2O$ nor $K_2O$. If it contains any one of them, yellow color by colloidal silver, etc. may be remarkable.

Now, the composition of the glass of the present invention will be described as represented by mol %.

$B_2O_3$ is a glass network former and is essential. It is typically at most 40%.

$SiO_2$ is not essential, but may be incorporated up to 18% in order to stabilize the glass. It is typically at least 5%.

ZnO is not essential, but may be incorporated up to 60% to lower Ts or for another purpose. It is typically from 25 to 40%.

BaO is not essential, but may be incorporated up to 18% to lower Ts or for another purpose. It is typically from 7 to 16%.

$Bi_2O_3$ is a component to lower Ts and is essential. It is typically at most 12%.

$Al_2O_3$ is not essential, but may be incorporated up to 10% in order to stabilize the glass or for another purpose. It is typically at most 7%.

The glass of the present invention consists essentially of the above components, but may contain other components such as $CeO_2$ or $MnO_2$ within a range not to impair the purpose of the present invention. The total content of such other components is preferably at most 8%, typically at most 4%.

Now, the composition of the first glass will be described as represented by mol %.

$B_2O_3$ is a glass network former and is essential. If it is less than 28%, the transmittance of the glass layer obtained by firing (hereinafter sometimes referred to simply as transmittance) tends to be low. It is typically at least 29%. If it exceeds 32%, the transmittance tends to be low also.

$SiO_2$ is a glass network former and is essential. If it is less than 11%, the glass tends to be unstable. It is typically at least 14%. If it exceeds 17%, the transmittance tends to be low. It is typically at most 16%.

ZnO is a component to lower Ts and is essential. If it is less than 29%, the transmittance tends to be low. It is typically at least 31%. If it exceeds 35%, the glass tends to be unstable.

BaO is a component to lower Ts and is essential. If it is less than 10%, the transmittance tends to be low. If it exceeds 14%, α tends to be high.

$Bi_2O_3$ is a component to lower Ts and is essential. If it is less than 7%, Ts tends to be high. It is typically at least 8%. If it exceeds 10%, α or $\in$ may be high.

$Al_2O_3$ is not essential, but may be incorporated up to 5% in order to stabilize the glass or for another purpose. If it exceeds 5%, the transmittance tends to be low. In a case where $Al_2O_3$ is contained, the content is typically at least 1.5%.

The first glass consists essential of the above components, but may contain other components within a range not to impair the purpose of the present invention. In such a case, the total content of such other components is preferably at most 4%.

Such components may, for example, be $CeO_2$, $MnO_2$ or CoO which is added to suppress yellow color by colloidal silver, etc. or for another purpose, MgO which is added to milden viscous behavior of the glass or for another purpose, $SnO_2$ which is added to accelerate decomposition of the resin or for another purpose, or $La_2O_3$ which is added to adjust $\in$ or for another purpose. Typically, $CeO_2$ or $MnO_2$ is contained, and their contents may, for example, be respectively from 0.05 to 0.2%.

The first glass contains no PbO, and it preferably contains no $P_2O_5$. If it contains $P_2O_5$, the transmittance may be low.

Further, in a case where CuO is contained, its content is preferably at most 0.3%. If it exceeds 0.3%, the transmittance may be low. It is typically at most 0.2%.

In a case where $TiO_2$ is contained, its content is preferably at most 2%. If it exceeds 2%, the glass may be unstable, or the transmittance may be low.

Now, the composition of the second glass will be described as represented by mass percentage.

$B_2O_3$ is a glass network former and is essential. If it is less than 14%, the transmittance tends to be low. It is typically at least 16%. If it exceeds 20%, the transmittance tends to be low also.

$SiO_2$ is a glass network former and is essential. If it is less than 6%, the glass tends to be unstable. If it exceeds 9%, the transmittance tends to be low.

ZnO is a component to lower Ts and is essential. If it is less than 20%, the transmittance tends to be low. It is typically at least 21%. If it exceeds 25%, the glass tends to be unstable. It is typically at most 24.5%.

BaO is a component to lower Ts and is essential. If it is less than 10%, the transmittance tends to be low. It is typically at least 12%. If it exceeds 19%, α tends to be high. It is typically at most 17.5%.

$Bi_2O_3$ is a component to lower Ts and is essential. If it is less than 30%, Ts tends to be high. It is typically at least 33%. If it exceeds 38%, α or $\in$ may be high.

$Al_2O_3$ is not essential, but may be incorporated up to 5% in order to stabilize the glass or for another purpose. If it exceeds 5%, the transmittance tends to be low. It is typically at most 4%. In a case where $Al_2O_3$ is contained, its content is typically at least 1.5%.

If ZnO—($SiO_2$+$Al_2O_3$) i.e. the value obtained by subtracting the sum of contents of $SiO_2$ and $Al_2O_3$ from the ZnO content is less than 9.5%, T will be low. It is preferably at least 10%. Further, it is typically at most 17%.

The second glass consists essentially of the above components, but may contain other components within a range not to impair the purpose of the present invention. In such a case, the total content of such other components is preferably at most 8%.

Such components may, for example, be $CeO_2$, $MnO_2$ or CoO which is added to suppress yellow color by colloidal silver, etc. or for another purpose, MgO which is added to milden the viscous behavior of the glass or for another purpose, $SnO_2$ which is added to accelerate decomposition of the resin or for another purpose, or $La_2O_3$ which is added to adjust $\in$ or for another purpose. Typically, $CeO_2$ or $MnO_2$ is contained, and their contents may, for example, be from 0.15 to 0.35%, and from 0.05 to 0.15%, respectively.

The second glass contains no PbO, and preferably contains no $P_2O_5$. If it contains $P_2O_5$, the transmittance may be low.

Further, in a case where CuO is contained, its content is preferably at most 0.2%. If it exceeds 0.2%, the transmittance may be low.

In a case where $TiO_2$ is contained, its content is preferably at most 1.2%. If it exceeds 1.2%, the glass may be unstable or the transmittance may be low.

Now, the composition of the third glass will be described as represented by mol %.

$B_2O_3$ is a glass network former and is essential. If it is less than 25%, the transmittance of the glass layer obtained by firing tends to be low. It is typically at least 28%. If it exceeds 60%, the transmittance tends to be low also. It is preferably at most 35%, typically at most 32%.

$SiO_2$ is not essential, but may be incorporated up to 18% in order to stabilize the glass. If it exceeds 18%, the transmittance tends to be low. In a case where $SiO_2$ is contained, its content is typically from 11 to 17%.

ZnO is not essential, but may be incorporated up to 60% in order to lower Ts. If it exceeds 60%, the glass tends to be unstable. It is typically at most 35%. In a case where ZnO is contained, its content is preferably at least 27%, typically at least 29%.

Each of MgO, CaO, SrO and BaO is a component to lower Ts, and at least one of them is required to be contained. If the total content of these four components is less than 7%, the transmittance tends to be low. If it exceeds 18%, α may be high.

Among the above four components, BaO is preferably contained. In a case where BaO is contained, its content is preferably from 7 to 16%, typically from 10 to 14%.

In a case where the viscous behavior of the glass should be mild, etc., MgO is preferably contained.

In a case where CaO is contained, its content is preferably at most 9%. If it exceeds 9%, the transmittance tends to be low.

$Bi_2O_3$ is a component to lower Ts and is essential. If it is less than 3%, Ts tends to be high. It is typically at least 7%. If it exceeds 15%, α or ∈ tends to be high. It is typically at most 10%.

$Al_2O_3$ is not essential, but may be incorporated up to 10% in order to stabilize the glass or for another purpose. If it exceeds 10%, the transmittance tends to be low. It is typically at most 5%. In a case where $Al_2O_3$ is contained, its content is typically at least 1.5%.

Each of $CeO_2$ and $MnO_2$ is a component to prevent yellow color by colloidal silver, etc. from being remarkable and to prevent coloring of the glass layer covering electrodes from being significant, and is essential. Typically, each of them is from 0.05 to 0.15%.

As a preferred embodiment, glass comprising from 25 to 35% of $B_2O_3$, from 27 to 60% of ZnO, from 7 to 16% of BaO, from 3 to 10% of $Bi_2O_3$ and from 0 to 5% of $Al_2O_3$ may be mentioned. Typically, the glass comprising from 28 to 32% of $B_2O_3$, from 11 to 17% of $SiO_2$, from 29 to 35% of ZnO, from 10 to 14% of BaO and from 7 to 10% of $Bi_2O_3$.

The third glass consists essentially of the above components, but may contain other components within a range not to impair the purpose of the present invention. In such a case, the total content of such other components is preferably at most 4%.

Such components may, for example, be CoO, CuO or $TiO_2$, $SnO_2$ which is added to accelerate decomposition of the resin or for another purpose, or $La_2O_3$ which is added to adjust ∈ or for another purpose.

The third glass contains no PbO, and preferably contains no $P_2O_5$. If it contains $P_2O_5$, the transmittance may be low.

Further, in a case where CuO is contained, its content is preferably at most 0.3%. If it exceeds 0.3%, the transmittance may be low.

In a case where $TiO_2$ is contained, its content is preferably at most 2%. If it exceeds 2%, the glass may be unstable or the transmittance may be low.

Now, the present invention will be described in further detail with reference to Examples. However, it should be understood that the present invention is by no means restricted to such specific Examples.

Starting materials were formulated and mixed so that the respective compositions would be as shown by mol % in lines from $B_2O_3$ to CuO in Tables 1, 3 and 5, then each mixture was melted for 1 hour in an electric furnace of from 1,200 to 1,350° C. by means of a platinum crucible and formed into a thin plate glass, which was then pulverized by a ball mill and classified by air classification to obtain a glass powder. Examples 1 to 20 correspond to the first or second glass, and Examples 21 and 22 correspond to Comparative Examples to such glass. In Tables 2, 4 and 6, the composition of each glass represented by mass percentage is shown, and in the line for "Zn—(Si+Al)", the content of ZnO—($SiO_2+Al_2O_3$) is shown.

With respect to each glass, Tg (unit: ° C.), Ts (unit: ° C.), α (unit: $10^{-7}$/° C.) and ∈ were measured as described below. The results are shown in Tables 1, 3 and 5.

Tg, Ts: Measured by means of a differential thermal analyzer.

α: A glass powder was molded and then fired by maintaining it at 580° C. for 10 minutes to obtain a sintered product, which was processed into a cylindrical shape having a diameter of 5 mm and a length of 2 cm, whereupon the average linear expansion coefficient within a range of from 50 to 350° C. was measured by a thermal expansion meter.

∈: A molten glass was annealed and molded into a plate, which was cut and polished into a shape having a diameter of 50 mm and a thickness of 3 mm, and gold electrodes were formed on both sides by a vacuum vapor deposition method to obtain a sample. The relative dielectric constant at 20° C. at 1 kHz of this sample was measured by a LCR meter.

32.5 g of the above glass powder was kneaded with 12.5 g of an organic vehicle to prepare a glass paste. Here, the organic vehicle was prepared by dissolving 10 mass % of ethylcellulose in α-terpineol.

Then, two glass substrates (PD200 manufactured by Asahi Glass Company, Limited) having a size of 50 mm×75 mm and a thickness of 2.8 mm, were prepared. At a portion of 48 mm×38 mm on the top surface (a surface which was not in contact with molten tin in the float process) of these glass substrates produced by the float process, the above glass paste was uniformly blade-coated by using a metal mask having a thickness of 100 μm or 125 μm and dried at 120° C. for 10 minutes. These glass substrates were heated at a heating temperature of 10° C./min until the temperatures reached 570° C. and 590° C., respectively, and maintained at such temperatures for 30 minutes for firing. The thickness of the glass layer thus formed on the glass substrate was from 20 to 30 μm.

With respect to these glass substrates provided with a glass layer, the transmittance to linear light having a wavelength of 550 nm was measured as described below. The results are shown in Tables. Here, T (570° C.) and T (590° C.) are transmittances in cases where firing was carried out 570° C. and 590° C., respectively.

Transmittance: The transmittance to linear light having a wavelength of 550 nm was measured by means of a self-recording spectrophotometer U-4100 manufactured by Hitachi, Ltd. (the transmittance without a sample was rated 100%). This transmittance is preferably at least 70%.

TABLE 1

| | Ex. | | | | | | | |
|---|---|---|---|---|---|---|---|---|
| | 1 | 2 | 3 | 4 | 5 | 6 | 7 | 8 |
| $B_2O_3$ | 28.8 | 28.9 | 29.2 | 30.0 | 29.4 | 29.4 | 31.3 | 31.3 |
| $SiO_2$ | 15.9 | 14.6 | 15.1 | 14.0 | 14.8 | 14.9 | 15.1 | 14.4 |
| ZnO | 29.8 | 30.8 | 30.2 | 30.5 | 31.4 | 31.4 | 31.8 | 31.8 |
| BaO | 13.1 | 10.3 | 13.3 | 13.0 | 10.5 | 10.5 | 10.8 | 11.3 |
| $Bi_2O_3$ | 9.1 | 9.8 | 8.9 | 9.0 | 9.6 | 9.6 | 9.4 | 9.0 |
| $Al_2O_3$ | 3.0 | 4.1 | 3.1 | 3.0 | 4.2 | 4.2 | 0 | 2.1 |
| MgO | 0 | 0 | 0 | 0 | 0 | 0 | 0 | 0 |
| $SnO_2$ | 0 | 1.5 | 0 | 0 | 0 | 0 | 1.5 | 0 |
| $La_2O_3$ | 0 | 0 | 0 | 0 | 0 | 0 | 0 | 0 |
| $CeO_2$ | 0.2 | 0.1 | 0.2 | 0.2 | 0.1 | 0 | 0.1 | 0.1 |
| $MnO_2$ | 0 | 0 | 0 | 0 | 0.1 | 0 | 0 | 0.1 |
| CoO | 0 | 0 | 0 | 0.4 | 0 | 0 | 0 | 0 |
| T(570° C.) | 74 | 76 | 74 | 71 | 74 | 76 | 74 | 74 |
| T(590° C.) | 75 | 75 | 75 | 73 | 76 | 77 | 74 | 74 |
| Tg | 493 | 492 | 489 | 491 | 489 | 489 | 497 | 492 |
| Ts | 590 | 595 | 591 | 587 | 591 | 591 | 599 | 588 |
| α | 76.2 | 72.6 | 76.5 | 77.0 | 73.3 | 73.7 | 75.5 | 75.0 |
| ε | 12.0 | 12.1 | 12.0 | 12.1 | 12.0 | 12.0 | 12.3 | 11.9 |

TABLE 2

| | Ex. | | | | | | | |
|---|---|---|---|---|---|---|---|---|
| | 1 | 2 | 3 | 4 | 5 | 6 | 7 | 8 |
| $B_2O_3$ | 16.7 | 16.5 | 17.0 | 17.4 | 17.0 | 17.1 | 18.2 | 18.5 |
| $SiO_2$ | 8.0 | 7.2 | 7.6 | 7.0 | 7.4 | 7.4 | 7.6 | 7.3 |
| ZnO | 20.2 | 20.6 | 20.6 | 20.7 | 21.3 | 21.3 | 21.6 | 21.9 |
| BaO | 16.8 | 12.9 | 17.1 | 16.7 | 13.4 | 13.4 | 13.8 | 14.7 |
| $Bi_2O_3$ | 35.4 | 37.4 | 34.8 | 35.0 | 37.1 | 37.2 | 36.7 | 35.7 |
| $Al_2O_3$ | 2.6 | 3.4 | 2.6 | 2.6 | 3.6 | 3.6 | 0 | 1.8 |
| MgO | 0 | 0 | 0 | 0 | 0 | 0 | 0 | 0 |
| $SnO_2$ | 0 | 1.8 | 0 | 0 | 0 | 0 | 1.9 | 0 |
| $La_2O_3$ | 0 | 0 | 0 | 0 | 0 | 0 | 0 | 0 |
| $CeO_2$ | 0.3 | 0.1 | 0.3 | 0.3 | 0.1 | 0 | 0.1 | 0.1 |
| $MnO_2$ | 0 | 0 | 0 | 0 | 0.1 | 0 | 0 | 0.1 |
| CoO | 0 | 0 | 0 | 0.3 | 0 | 0 | 0 | 0 |
| Zn—(Si + Al) | 9.6 | 10.0 | 10.4 | 11.1 | 10.3 | 10.3 | 14.0 | 12.8 |

TABLE 3

| | Ex. | | | | | | | |
|---|---|---|---|---|---|---|---|---|
| | 9 | 10 | 11 | 12 | 13 | 14 | 15 | 16 |
| $B_2O_3$ | 30.2 | 31.0 | 31.0 | 30.8 | 31.3 | 31.3 | 31.3 | 31.6 |
| $SiO_2$ | 12.1 | 15.2 | 14.7 | 15.2 | 15.4 | 15.4 | 15.4 | 14.5 |
| ZnO | 33.2 | 33.5 | 32.9 | 33.4 | 33.9 | 33.9 | 33.9 | 34.2 |
| BaO | 13.1 | 11.2 | 13.6 | 10.2 | 10.4 | 10.3 | 10.3 | 10.4 |
| $Bi_2O_3$ | 8.2 | 8.9 | 7.6 | 8.9 | 9.0 | 8.9 | 8.9 | 9.1 |
| $Al_2O_3$ | 3.0 | 0 | 0 | 0 | 0 | 0 | 0 | 0 |
| MgO | 0 | 0 | 0 | 1.5 | 0 | 0 | 0 | 0 |
| SnO2 | 0 | 0 | 0 | 0 | 0 | 0 | 0 | 0 |
| $La_2O_3$ | 0 | 0 | 0 | 0 | 0 | 0 | 0 | 0 |
| $CeO_2$ | 0.2 | 0.1 | 0.1 | 0 | 0 | 0.1 | 0.1 | 0.1 |
| $MnO_2$ | 0 | 0.1 | 0.1 | 0 | 0 | 0.1 | 0 | 0.1 |
| CoO | 0 | 0 | 0 | 0 | 0 | 0 | 0 | 0 |
| T(570° C.) | 76 | 77 | 73 | 72 | 74 | 73 | 73 | 75 |
| T(590° C.) | 76 | 78 | 74 | 71 | 74 | 72 | 74 | 75 |
| Tg | 490 | 495 | 497 | 495 | 495 | 494 | 495 | 493 |
| Ts | 586 | 590 | 594 | 584 | 595 | 588 | 596 | 590 |
| α | 76.2 | 77.0 | 77.8 | 74.6 | 75.2 | 73.1 | 74.7 | 76.1 |
| ε | 12.0 | 12.1 | 11.8 | 12.0 | 12.1 | 12.0 | 11.9 | 12.2 |

TABLE 4

| | Ex. | | | | | | | |
|---|---|---|---|---|---|---|---|---|
| | 9 | 10 | 11 | 12 | 13 | 14 | 15 | 16 |
| $B_2O_3$ | 17.9 | 18.4 | 19.0 | 18.6 | 18.7 | 18.8 | 18.8 | 18.8 |
| $SiO_2$ | 6.2 | 7.8 | 7.8 | 7.9 | 7.9 | 8.0 | 8.0 | 7.4 |
| ZnO | 23.1 | 23.3 | 23.5 | 23.6 | 23.7 | 23.7 | 23.7 | 23.7 |
| BaO | 17.1 | 14.6 | 18.3 | 13.6 | 13.7 | 13.5 | 13.5 | 13.6 |
| $Bi_2O_3$ | 32.8 | 35.6 | 31.1 | 35.8 | 36.0 | 35.8 | 35.8 | 36.3 |
| $Al_2O_3$ | 2.6 | 0 | 0 | 0 | 0 | 0 | 0 | 0 |
| MgO | 0 | 0 | 0 | 0.5 | 0 | 0 | 0 | 0 |
| SnO2 | 0 | 0 | 0 | 0 | 0 | 0 | 0 | 0 |
| $La_2O_3$ | 0 | 0 | 0 | 0 | 0 | 0 | 0 | 0 |
| $CeO_2$ | 0.3 | 0.1 | 0.2 | 0 | 0 | 0.2 | 0.2 | 0.2 |
| $MnO_2$ | 0 | 0.1 | 0.1 | 0 | 0 | 0.1 | 0 | 0.1 |
| CoO | 0 | 0 | 0 | 0 | 0 | 0 | 0 | 0 |
| Zn—(Si + Al) | 14.3 | 15.5 | 15.7 | 15.7 | 15.8 | 15.7 | 15.7 | 16.3 |

TABLE 5

| | Ex. | | | | | |
|---|---|---|---|---|---|---|
| | 17 | 18 | 19 | 20 | 21 | 22 |
| $B_2O_3$ | 31.2 | 31.9 | 31.1 | 30.8 | 33.0 | 31.1 |
| $SiO_2$ | 15.1 | 14.2 | 15.3 | 14.8 | 18.5 | 15.5 |
| ZnO | 33.8 | 33.9 | 33.6 | 31.3 | 27.2 | 37.3 |
| BaO | 11.3 | 11.1 | 11.2 | 10.6 | 10.9 | 6.7 |
| $Bi_2O_3$ | 8.4 | 8.1 | 7.6 | 9.3 | 10.4 | 9.3 |
| $Al_2O_3$ | 0 | 0 | 0 | 0 | 0 | 0 |
| MgO | 0 | 0 | 0 | 0 | 0 | 0 |
| SnO2 | 0 | 0 | 0 | 1.5 | 0 | 0 |
| $La_2O_3$ | 0 | 0.5 | 1.0 | 1.5 | 0 | 0 |
| $CeO_2$ | 0.1 | 0.1 | 0.1 | 0.1 | 0 | 0.1 |
| $MnO_2$ | 0.1 | 0.1 | 0.1 | 0 | 0 | 0 |
| CoO | 0 | 0 | 0 | 0 | 0 | 0 |
| T(570° C.) | 76 | 74 | 74 | 73 | 63 | 62 |
| T(590° C.) | 77 | 76 | 76 | 75 | 61 | 61 |
| Tg | 494 | 502 | 502 | 503 | 497 | 493 |
| Ts | 592 | 598 | 598 | 602 | 580 | 579 |
| α | 75.4 | 75.2 | 74.6 | 76.5 | 75.6 | 70.2 |
| ε | 11.9 | 12.0 | 12.0 | 12.7 | 12.0 | 12.0 |

TABLE 6

| | Ex. | | | | | |
|---|---|---|---|---|---|---|
| | 17 | 18 | 19 | 20 | 21 | 22 |
| $B_2O_3$ | 18.9 | 19.3 | 18.9 | 17.5 | 18.9 | 18.8 |
| $SiO_2$ | 7.9 | 7.4 | 8.0 | 7.3 | 9.2 | 8.1 |
| ZnO | 23.9 | 24.0 | 23.9 | 20.7 | 18.2 | 26.3 |
| BaO | 15.1 | 14.8 | 15.0 | 13.2 | 13.8 | 9.0 |
| $Bi_2O_3$ | 34.0 | 32.8 | 31.1 | 35.3 | 39.9 | 37.7 |
| $Al_2O_3$ | 0 | 0 | 0 | 0 | 0 | 0 |
| MgO | 0 | 0 | 0 | 0 | 0 | 0 |
| SnO2 | 0 | 0 | 0 | 1.9 | 0 | 0 |
| $La_2O_3$ | 0 | 1.4 | 2.9 | 4.0 | 0 | 0 |
| $CeO_2$ | 0.1 | 0.2 | 0.2 | 0.1 | 0 | 0.2 |
| $MnO_2$ | 0.1 | 0.1 | 0.1 | 0 | 0 | 0 |
| CoO | 0 | 0 | 0 | 0 | 0 | 0 |
| Zn—(Si + Al) | 16.0 | 16.6 | 15.9 | 13.4 | 9.0 | 18.2 |

Starting materials were formulated and mixed so that the respective compositions would be as shown by mol % in lines from $B_2O_3$ to $MnO_2$ in Table 7, then each mixture was melted for 1 hour in an electric furnace of from 1,200 to 1,350° C. by means of a platinum crucible and formed into a thin plate glass, which was then pulverized by a ball mill and classified by air classification to obtain a glass powder. Examples 31 to 33 correspond to the third glass, and Examples 34 to 39 correspond to Comparative Examples to such glass. Here, Examples 31, 32, 33, 37 and 38 are the same as Examples 14, 10, 16, 15 and 21, respectively. Examples 38 and 39 are within the range of the glass composition as disclosed in the above JP-A-2003-226549, and their compositions as represented by mass percentage are shown in Table 8.

With respect to each glass, Tg (unit: ° C.), Ts (unit: ° C.), α (unit: $10^{-7}$/° C.) and $\in$ were measured in the same manner as described above. The results are shown in Table 7.

32.5 g of the above glass powder was kneaded with 12.5 g of an organic vehicle to prepare a glass paste. The organic vehicle was prepared by dissolving 10 mass % of ethylcellulose in α-terpineol.

Further, T (570° C.) and T (590° C.) were measured in the same manner as described above. The results are shown in Table 7.

Then, two glass substrates (PD200 manufactured by Asahi Glass Company, Limited) having a size of 50 mm×75 mm and a thickness of 2.8 mm were prepared.

At a portion of 46 mm×32 mm on the top surface of such glass substrates, silver paste NP-4028A manufactured by Noritake Co., Limited was screen-printed, and then dried and fired to prepare glass substrates having a silver layer formed thereon.

So as to cover the silver layer of these glass substrates having a silver layer formed thereon, at a portion of 48 mm×38 mm on the surface having the silver layer formed thereon, the above glass paste was uniformly blade-coated by using a metal mask having a thickness of 100 μm or 125 μm, and dried at 120° C. for 10 minutes. These glass substrates were heated at a heating rate of 10° C./min until the temperatures reached 570° C. and 590° C., respectively, and maintained at such temperatures for 30 minutes for firing. The thickness of the obtained glass layer was from 20 to 30 μm.

With respect to the glass substrates having a glass layer formed thereon, the L value, the a value and the b value were measured by means of a spectrocolorimeter. Namely, the glass substrate was placed on a white standard plate so that the surface having the glass layer formed thereon would be the measuring plane, and the L value, the a value and the b value were measured by means of a spectrocolorimeter manufactured by KONICA MINOLTA HOLDINGS, INC. The b values in cases where firing was carried out at 570° C. and 590° C. are shown in Table 7.

The above b value is preferably at most 12. If it exceeds 12, suppression of yellow color by colloidal silver, etc. tends to be insufficient.

Further, in order to examine the degree of coloring by the glass layer having a thickness of 25 μm, ΔL, Δa and Δb were measured as follows.

First, two glass substrates (PD200 manufactured by Asahi Glass Company, Limited) having a size of 50 mm×75 mm and a thickness of 2.8 mm were prepared.

At a portion of 48 mm×38 mm on the top surface of these glass substrates, the above glass paste was uniformly blade-coated by using metal masks having a thickness of 100 μm for one glass substrate and a thickness of 125 μm for the other glass substrate, and dried at 120° C. for 10 minutes.

Then, the glass substrates were heated at a heating rate of 10° C./min until the temperature reached 590° C., and maintained at the temperature for 30 minutes for firing to obtain glass substrates provided with a glass layer. The thicknesses of the obtained glass layers were about 20 μm and about 30 μm, respectively.

With respect to these two glass substrates provided with a glass layer, the L value, the a value and the b value were measured in the same manner as the above-described glass substrates having a silver layer formed thereon provided with a glass layer. The L value, the a value and the b value of the glass substrate provided with a glass layer having a thickness of the glass layer of 25 μm were obtained by interpolation from the L values, the a values and the b values of the above glass substrates having thicknesses of the glass layer of about 20 μm and about 30 μm.

Further, with respect to a glass substrate having no glass layer formed thereon also, the L value, the a value and the b value were measured.

The values ΔL, Δa and Δb obtained by subtracting the L value, the a value and the b value of the glass substrate having no glass layer formed thereon from the L value, the a value and the b value of the glass substrate provided with a glass layer having a thickness of the is glass layer of 25 μm are shown in Table 7. Δa is preferably from −0.5 to +0.5. If it is less than −0.5, green coloring tends to be significant, and if it exceeds +0.5, red coloring tends to be significant. Δb is preferably from −2.0 to +2.0. If it is less than −2.0, blue coloring tends to be significant, and if it exceeds +2.0, yellow coloring tends to be significant.

TABLE 7

| | Ex. | | | | | | | | |
|---|---|---|---|---|---|---|---|---|---|
| | 31 | 32 | 33 | 34 | 35 | 36 | 37 | 38 | 39 |
| $B_2O_3$ | 31.3 | 31.0 | 31.6 | 31.3 | 31.3 | 31.1 | 31.3 | 33.0 | 28.7 |
| $SiO_2$ | 15.4 | 15.2 | 14.5 | 15.4 | 15.4 | 15.3 | 15.4 | 18.5 | 14.8 |
| ZnO | 33.9 | 33.5 | 34.2 | 33.9 | 33.9 | 33.7 | 33.9 | 27.2 | 29.7 |
| BaO | 10.3 | 11.2 | 10.4 | 10.3 | 10.3 | 10.2 | 10.3 | 10.9 | 13.1 |
| $Bi_2O_3$ | 8.9 | 8.9 | 9.1 | 8.9 | 8.9 | 8.9 | 8.9 | 10.4 | 9.6 |
| $Al_2O_3$ | 0 | 0 | 0 | 0 | 0 | 0 | 0 | 0 | 3.0 |
| $CeO_2$ | 0.1 | 0.1 | 0.1 | 0 | 0 | 0 | 0.1 | 0 | 0.2 |
| $MnO_2$ | 0.1 | 0.1 | 0.1 | 0.1 | 0.2 | 0.8 | 0 | 0 | 0 |
| Tg | 494 | 495 | 493 | 494 | 493 | 496 | 495 | 497 | 489 |
| Ts | 588 | 590 | 590 | 587 | 583 | 596 | 596 | 580 | 585 |
| α | 73.1 | 77.0 | 76.1 | 75.7 | 76.5 | 74.2 | 74.7 | 75.6 | 78.7 |
| ∈ | 12.0 | 12.0 | 12.1 | 12.0 | 12.0 | 12.0 | 11.9 | 12.0 | 12.5 |
| T(570° C.) | 73 | 76 | 75 | 72 | 72 | 71 | 73 | 63 | 76 |
| T(590° C.) | 72 | 75 | 75 | 73 | 73 | 71 | 74 | 61 | 76 |

TABLE 7-continued

| | Ex. | | | | | | | | |
|---|---|---|---|---|---|---|---|---|---|
| | 31 | 32 | 33 | 34 | 35 | 36 | 37 | 38 | 39 |
| b(570° C.) | 12 | 10 | 7 | 5 | 5 | 10 | 21 | 19 | 16 |
| b(590° C.) | 6 | 5 | 5 | 16 | 10 | 7 | 14 | 8 | 12 |
| ΔL | −5 | −4 | −4 | −6 | −6 | −7 | −5 | −8 | −4 |
| Δa | 0 | 0 | 0.1 | 0.7 | 0.7 | 1.5 | −0.4 | 0.1 | −0.8 |
| Δb | 1.6 | 1.4 | 1.6 | 1.0 | 1.0 | 1.5 | 1.7 | 0.4 | 2.2 |

TABLE 8

| Ex. | $B_2O_3$ | $SiO_2$ | ZnO | BaO | $Bi_2O_3$ | $Al_2O_3$ | $CeO_2$ |
|---|---|---|---|---|---|---|---|
| 38 | 18.9 | 9.2 | 18.2 | 13.8 | 39.9 | 0 | 0 |
| 39 | 16.4 | 7.3 | 19.8 | 16.5 | 36.6 | 3.0 | 0.28 |

The glass of the present invention is useful for covering electrodes of a PDP substrate.

The entire disclosures of Japanese Patent Application No. 2005-292458 filed on Oct. 5, 2005 and Japanese Patent Application No. 2005-308300 filed on Oct. 24, 2005 including specifications, claims and summaries are incorporated herein by reference in their entireties.

What is claimed is:

1. Glass for covering electrodes, which consists essentially of, as represented by mol % based on the following oxides, from 25 to 60% of $B_2O_3$, from 0 to 18% of $SiO_2$, from 0 to 60% of ZnO, from 0 to 18% of BaO, from 3 to 15% of $Bi_2O_3$ and from 0 to 10% of $Al_2O_3$, and contains no PbO, further containing $CeO_2$ or $MnO_2$, and none of $Li_2O$, $Na_2O$, nor $K_2O$.

2. The glass for covering electrodes according to claim 1, wherein, as represented by mol %, $B_2O_3$ is from 28 to 32%, $SiO_2$ is from 11 to 17%, ZnO is from 29 to 35%, BaO is from 10 to 14%, $Bi_2O_3$ is from 7 to 10%, and $Al_2O_3$ is from 0 to 5%.

3. The glass for covering electrodes according to claim 1, wherein, as represented by mol %, $B_2O_3$ is from 25 to 35%, ZnO is from 27 to 60%, BaO is from 7 to 16%, $Bi_2O_3$ is from 3 to 10%, and $Al_2O_3$ is from 0 to 5%.

4. The glass for covering electrodes according to claim 3, wherein, as represented by mol %, $B_2O_3$ is from 28 to 32%, $SiO_2$ is from 11 to 17%, ZnO is from 29 to 35%, BaO is from 10 to 14%, and $Bi_2O_3$ is from 7 to 10%.

5. Glass for covering electrodes, which consists essentially of, as represented by mass percentage based on the following oxides, from 14 to 20% of $B_2O_3$, from 6 to 9% of $SiO_2$, from 20 to 25% of ZnO, from 10 to 19% of BaO, from 30 to 38% of $Bi_2O_3$ and from 0 to 5% of $Al_2O_3$, provided that ZnO—($SiO_2$,$Al_2O_3$) is at least 9.5%, and contains no PbO, further containing $CeO_2$ or $MnO_2$, and none of $Li_2O$, $Na_2O$, nor $K_2O$.

6. A plasma display panel comprising a front substrate to be used as a display surface, a rear substrate and barrier ribs to define cells, wherein electrodes formed on a glass substrate constituting the front substrate or electrodes formed on a glass substrate constituting the rear substrate are covered by the glass for covering electrodes as defined in claim 1.

7. A plasma display panel comprising a front substrate to be used as a display surface, a rear substrate and barrier ribs to define cells, wherein electrodes formed on a glass substrate constituting the front substrate or electrodes formed on a glass substrate constituting the rear substrate are covered by the glass for covering electrodes as defined in claim 5.

8. Glass for covering electrodes, which consists essentially of as represented by mol % based on the following oxides, from 25 to 60% of $B_2O_3$, from 0 to 18% of $SiO_2$, from 0 to 60% of ZnO, from 0 to 18% of BaO, from 3 to 15% of $Bi_2O_3$ and from 0 to 10% of $Al_2O_3$, and contains no PbO;
wherein the glass contains at least one alkaline earth metal oxide selected from the group consisting of MgO, CaG, SrO and BaO, and $CeO_2$ and $MnO_2$, wherein, as represented by mol % based on the following oxides, MgO+CaO+SrO+BaO is from 7 to 18%, $CeO_2$ is from 0.05 to 0.2%, and $MnO_2$ is from 0.05 to 0.2%.

9. The glass for covering electrodes according to claim 8, wherein, as represented by mol %, $B_2O_3$ is from 25 to 35%, ZnO is from 27 to 60%, BaO is from 7 to 16%, $Bi_2O_3$ is from 3 to 10%, and $Al_2O_3$ is from 0 to 5%.

10. The glass for covering electrodes according to claim 9, wherein, as represented by mol %, $B_2O_3$ is from 28 to 32%, $SiO_2$ is from 11 to 17%, ZnO is from 29 to 35%, BaO is from 10 to 14%, and $Bi_2O_3$ is from 7 to 10%.

11. The glass for covering electrodes according to claim 8, which contains none of $Li_2O$, $Na_2O$ nor $K_2O$.

12. A plasma display panel comprising a front substrate to be used as a display surface, a rear substrate and barrier ribs to define cells, wherein electrodes formed on a glass substrate constituting the front substrate or electrodes formed on a glass substrate constituting the rear substrate are covered by the glass for covering electrodes as defined in claim 8.

* * * * *